No. 642,273. Patented Jan. 30, 1900.
D. E. WHITE.
FURROW OPENING MACHINE.
(Application filed Feb. 7, 1899.)
(No Model.) 2 Sheets—Sheet 1.
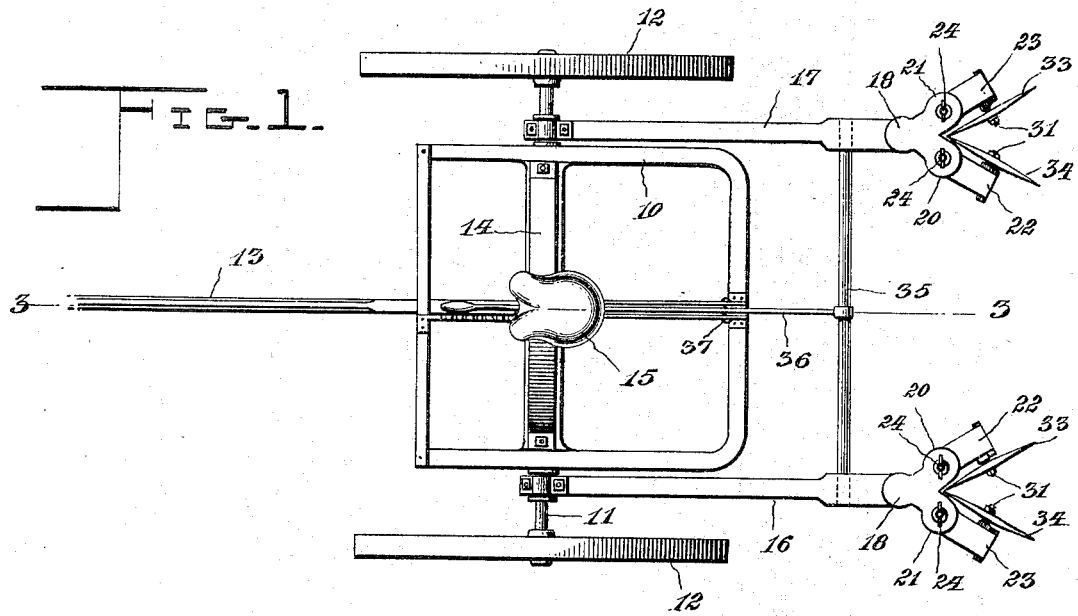
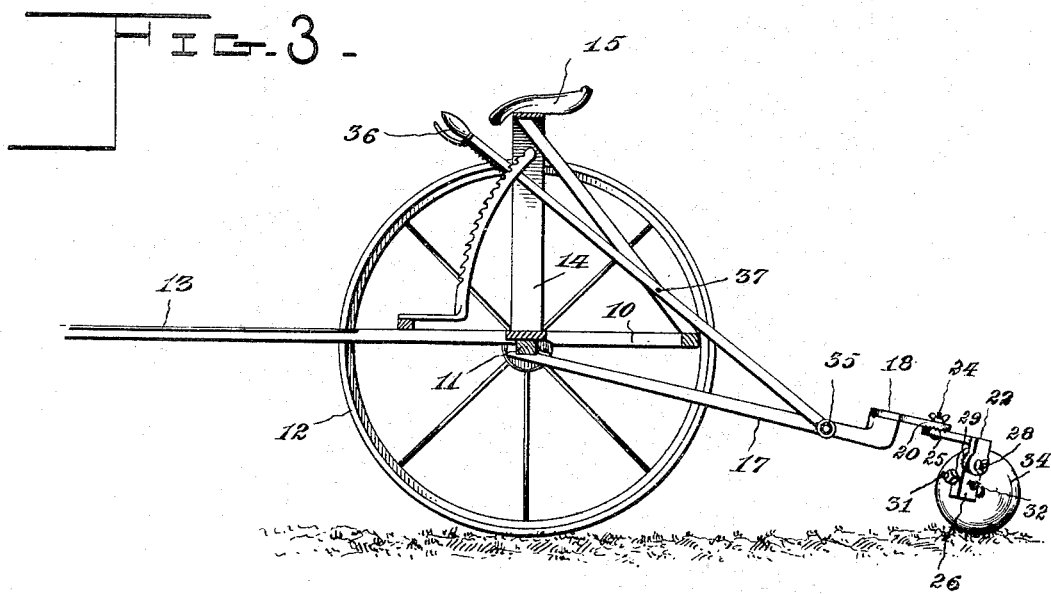
Witnesses
David E. White, Inventor
By his Attorneys,
C. A. Snow & Co.
THE NORRIS PETERS CO., PHOTO-LITHO., WASHINGTON, D. C.

No. 642,273. Patented Jan. 30, 1900.
D. E. WHITE.
FURROW OPENING MACHINE.
(Application filed Feb. 7, 1899.)
(No Model.) 2 Sheets—Sheet 2.
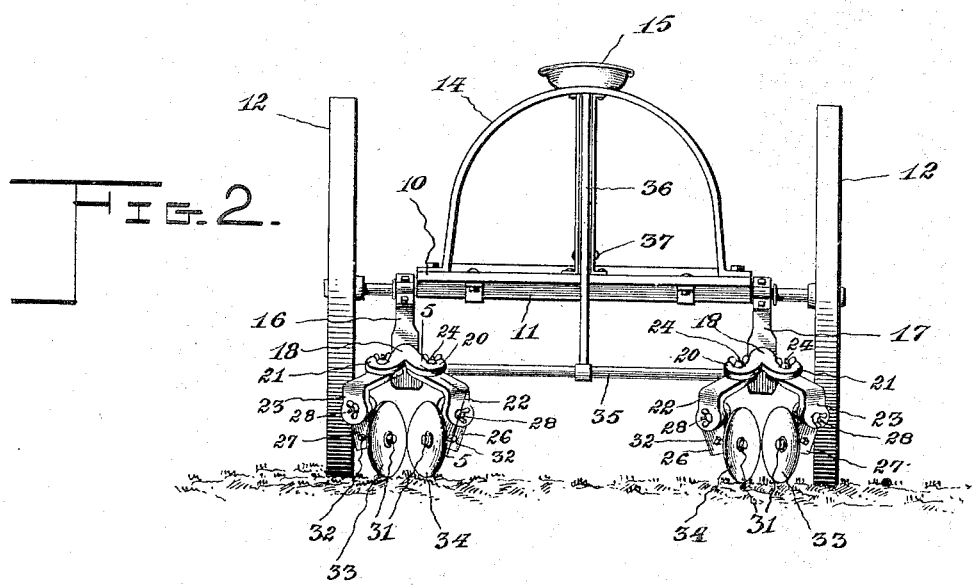
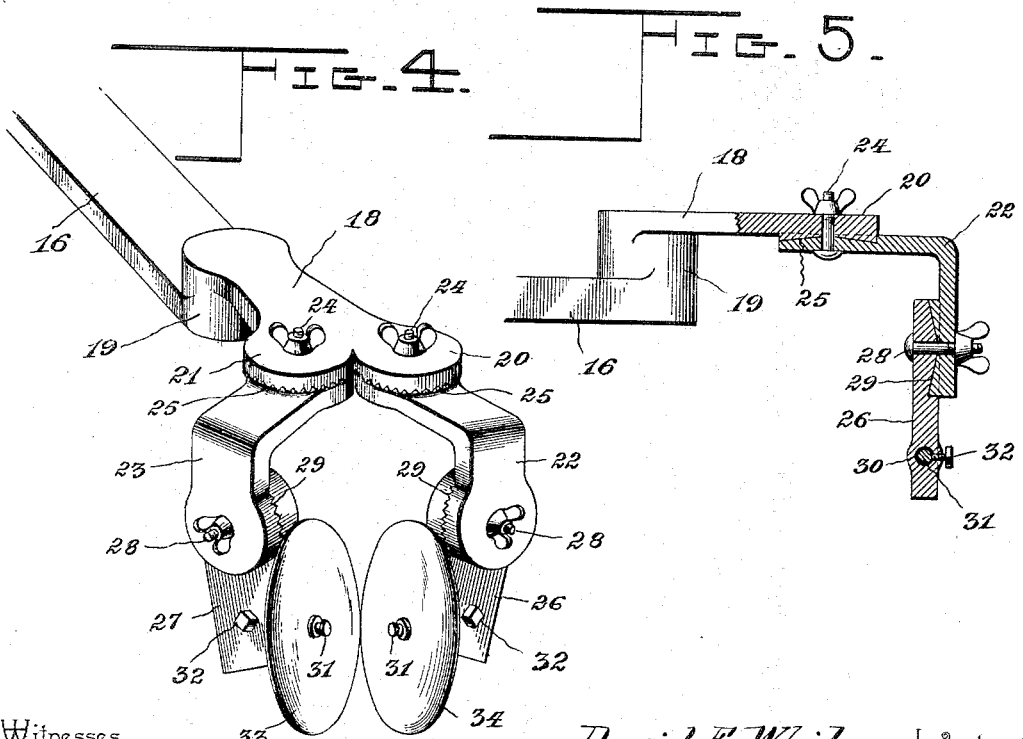
Witnesses
John F. Deufferwid
H. H. Bemford
David E. White, Inventor
By his Attorneys,
C A Snow & Co.

UNITED STATES PATENT OFFICE.

DAVID E. WHITE, OF WINCHESTER, KANSAS.

FURROW-OPENING MACHINE.

SPECIFICATION forming part of Letters Patent No. 642,273, dated January 30, 1900.

Application filed February 7, 1899. Serial No. 704,831. (No model.)

*To all whom it may concern:*

Be it known that I, DAVID E. WHITE, a citizen of the United States, residing at Winchester, in the county of Jefferson and State of Kansas, have invented a new and useful Furrow-Opening Machine, of which the following is a specification.

My invention relates to a furrow-opening machine to be used in corn-growing districts for making furrows in the ground before a corn-planter is drawn across the field to plant the corn in the furrows opened by the machine of my invention, whereby the corn may be planted at a considerable depth in the furrows, to the end that the roots of the growing plants may extend down into the ground a considerable distance, so as to be kept in a moist condition and to be protected from droughts and to enable weeds to be eradicated without injury to the roots, and the plants are bedded so firmly that they are not likely to be blown over.

The prime object of the invention is to provide a simple machine which is equipped with means for opening parallel furrows and which may be used on trashy ground without hindrance or obstruction from refuse or vegetable growths.

A further object of the invention is to provide means adapted to throw the furrow-opening disks out of operative position in moving the machine to or from a field and to provide means by which the disks may be held firmly in their adjusted operative positions.
With these ends in view the invention consists in the novel combination of elements and in the construction and arrangement of parts, which will be hereinafter fully described and claimed.
To enable others to understand the invention, I have illustrated the preferred embodiment thereof in the accompanying drawings, forming part of this specification, and in which—
Figure 1 is a plan view of a furrow-opening machine constructed in accordance with my invention. Fig. 2 is a rear elevation of the machine. Fig. 3 is a vertical longitudinal sectional elevation on the plane indicated by the dotted line 3 3 of Fig. 1. Fig. 4 is a detailed perspective view of one of the gangs of disks. Fig. 5 is a longitudinal sectional elevation through one of the adjusting-heads and on the plane indicated by dotted line 5 5, Fig. 2.

The same numerals of reference are used in all the figures in the designation of identical parts.

In carrying my invention into practice I employ a carrying-frame 10, which may consist of suitable cross and side rails joined firmly together. The axle 11 is supported on this carrying-frame to receive the wheels 12, and the draft-tongue 13 is joined firmly to the carrying-frame at the middle thereof. The standards 14 are secured to the side rails of the frame 10 in any suitable way, and said standards support the driver's seat 15.

For supporting the two pairs or gangs of furrow-opening disks I employ the bars 16 17, which are connected operatively with the frame 10 and are spaced apart a distance equivalent to the distance between the rows in which the corn is to be deposited by the operation of an ordinary type of corn-planter. Said bars are arranged in inclined positions to extend rearwardly and downwardly from the frame, and the connection of the bars to the frame is effected, preferably, through the medium of the wheeled axle 11—that is to say, the upper front ends of the inclined bars are fitted loosely on the axle, so as to turn readily thereon. It is evident, however, that these inclined bars may be attached pivotally to the side rails of the frame 10; but this is an obvious expedient which I have not considered necessary to illustrate.

The pair of spaced inclined bars carry the two gangs of furrow-opening shovels, and the two gangs or pairs of shovels are thereby supported in proper operative position and at a required distance apart to open parallel furrows in the ground, said furrows being spaced a distance corresponding to the spacing of the dropping devices of the corn-planter.

I will now proceed to describe the construction of the means for supporting, adjusting, and arranging each pair or gang of furrow-opening shovels, and as the devices on the bars 16 17 are similar a description of one of said devices will answer for the other.

Each bar 16 or 17 is constructed at its rear end with a head 18, preferably in the form of a flat plate united to the rear extremity of the bar by a spacing-post 19, which is fast or integral with the bar and the head. The head is arranged above and parallel to the plane of the inclined bar, and the rear edge of this head is recessed or forked to provide the spaced ears 20 21. The angular brackets 22 23 are provided on each head 18, and said brackets are arranged for their horizontal members to lap against the ears of the head. The brackets are united pivotally adjustably to the head by means of vertical bolts 24, which pass through the ears 20 21 and the horizontal members of the angular brackets, and in order to firmly secure the brackets in their adjusted positions on the heads the opposing faces of the ears and the brackets are formed with interlocking ribs, (indicated at 25.) The bolts 24 may be loosened for the brackets to be adjusted laterally in order to free the interlocking ribs on the brackets and ears from engagement with each other, after which the brackets may be turned on the bolts to adjust the brackets relatively to each other. The bolts may now be tightened to draw the brackets toward the head and cause the ribs 25 to interlock, thus securing the brackets immovably in place on the head of the inclined bar.

The furrow-disks are supported by the hangers 26 27, one of which is connected pivotally with each of the brackets by means of a horizontal bolt 28, which passes through the upper end of the hanger and the vertical member of the angular bracket. The hangers and the brackets are formed with interlocking ribs 29 on their opposing faces, and said hangers are adapted to be adjusted toward or from each other on the bolts 28 when the latter are loosened; but by tightening the bolts the hangers are secured immovably in place on the brackets by the ribs 29 interlocking with each other.

It will be observed that the brackets are adjustable on the head and that the hangers are adjustable independently of each other on the brackets, such adjustment of the hangers being independent of any adjustment of the brackets on the head. Each hanger is provided near its lower end with a transverse axle-opening 30 to receive the axle 31, which is longitudinally adjustable and confined in place by means of a clamping-screw 32, that finds a bearing in a threaded opening in the hanger and is adapted to bind against the axle. The axles, supported in the two hangers 26 27, project through the inner opposing edges of said hangers, and on these protruding ends of the axles are loosely mounted the revoluble disks 33 34, a pair of which is supported by the hangers and brackets on the head of each inclined bar. The brackets are adjusted on the heads to present the axles in reversely-inclined positions, and the revoluble disks are mounted on the axles to assume reversely-inclined positions in which the front edges of the disks lie close together, thus making the disks diverge in a rearward direction. The disks are free to rotate on the axles, and when the machine is drawn across the field each pair of disks operates to press the dirt or soil outwardly in opposite directions, thereby opening a deep furrow in the ground.

It will be recalled that the inclined bars 16 17, carrying the two pairs of furrow-disks, are loosely supported on the frame or axle, and to adjust the furrow-disks and the bars out of operative position I employ a connecting-rod 35, which may be a solid piece of metal or a tubular rod in the form of a gas-pipe. This connecting rod or tube extends transversely across the machine in rear of the carrying-frame, and its ends are attached or fastened in any suitable way to the inclined bars 16 17 or to the heads 18 thereon, the attachment of said rod not interfering with the adjustment of the brackets or hangers. An adjusting-lever 36 is fulcrumed at a point intermediate its length on the carrying-frame 10, as at 37, and the rear end of this lever is properly connected with the transverse rod or tube 35, while its front end is arranged within convenient reach of the driver occupying the seat 15.

The machine of my invention is to be drawn across the field in advance of the corn-planter. In driving the machine to or from the field the operator should depress the front end of the lever 36, so as to raise the connecting rod or tube 35. The inclined bars 16 17 and the two pairs of furrow-shovels are supported on the inclined bars, thereby elevating the furrow-opening disks out of contact with the ground. On arriving at the field the lever is released and the bars 16 17 are lowered for the disks to enter the ground, which should be previously prepared. The two pairs of disks, the members of which are inclined reversely to each other, penetrate the ground a suitable distance, according to the adjustment of the lever, and the penetration of these disks into the ground is at points equivalent to the distance between the corn-dropping devices of the planting-machine. As my machine is drawn across the field the disks are rotated on their axles, and they press the soil outwardly in opposite directions to open a deep furrow in the ground. The operation of opening the parallel furrows is followed by the corn-planting operation of the ordinary machine, and this machine is driven to cause its dropping devices to deposit the corn into the furrows opened by my machine. The angular brackets are clamped to the head 18 to assume positions inclined reversely to the longitudinal axis of the inclined bar, and the distance between the shovels may be regulated either by adjusting the brackets on the head or by adjusting the hangers on the brackets. The hangers may readily be detached from the brackets to provide for the removal of worn disks, and said hangers may be adjusted independently of the brackets to compensate for wear on the disks. The parts are easily accessible for adjustment, and they are secured firmly and immovably in their proper working positions.

Changes in the form, proportion, size, and the minor details of construction within the scope of the appended claims may be resorted to without departing from the spirit or sacrificing any of the advantages of this invention.

What I claim is—

1. A furrow-opening machine consisting of a frame, inclined bars connected thereto and each provided with a forked head at its rear end, a pair of angular brackets adjustably fastened to each head, a pair of hangers angularly adjustable with relation to a vertical plane fastened to the brackets and carrying the axles, and inclined disks mounted on said axles, substantially as and for the purposes described.

2. A furrow-opening machine consisting of a frame, inclined bars connected thereto and each provided with a forked head, a pair of angularly-adjustable hangers connected to each head and provided with the reversely-inclined longitudinally-adjustable axles, and a pair of oppositely-inclined disks mounted on the axles of each head, substantially as described.

3. In a furrow-opening machine, the combination with suitable supporting means provided with a head, of oppositely-projecting angular brackets clamped adjustably to said head, axle-carrying hangers supported by the brackets and angularly adjustable with respect to a horizontal plane, and reversely-inclined disks supported loosely by the axles, substantially as described.

4. In a furrow-opening machine, the combination with a supporting-head, of brackets fastened adjustably to said head, hangers adjustably fastened to the brackets and provided with the reversely-inclined axles, and revoluble disks mounted loosely on the axles, the hangers being adjustable on the brackets independently of any adjustment of the brackets upon the head, and the angles of the axles being thereby adjustable with relation both to a vertical and horizontal plane, substantially as described.

5. In a furrow-opening machine, the combination with a supporting-head, of angular brackets having pivotal and interlocking engagement with said head and fastened adjustably thereto for movement relatively to each other, hangers fastened adjustably to and having pivotal and interlocking engagement with the angular brackets, and inclined disks mounted loosely on the hangers for adjustment therewith, the pivotal connection between the head and brackets being at right angles to the pivotal connection between the brackets and hangers, substantially as described.

In testimony that I claim the foregoing as my own I have hereto affixed my signature in the presence of two witnesses.

DAVID E. WHITE.

Witnesses:
ISAAC MILLER,
W. A. FRENCH.